(12) United States Patent
Kohata

(10) Patent No.: US 12,190,133 B2
(45) Date of Patent: Jan. 7, 2025

(54) IMAGE FORMING APPARATUS AND CONTROL METHOD FOR DISPLAYING THE AMOUNT OF A CONSUMABLE ITEM

(71) Applicant: Canon Kabushiki Kaisha, Tokyo (JP)

(72) Inventor: Toru Kohata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/192,763

(22) Filed: Mar. 30, 2023

(65) Prior Publication Data

US 2023/0325211 A1 Oct. 12, 2023

(30) Foreign Application Priority Data

Apr. 12, 2022 (JP) .................................. 2022-065856

(51) Int. Cl.
*G06K 15/00* (2006.01)
*G06F 9/451* (2018.01)

(52) U.S. Cl.
CPC ......... *G06F 9/451* (2018.02); *G06K 15/4075* (2013.01)

(58) Field of Classification Search
CPC .............................. G06K 15/4075; G06F 9/451
See application file for complete search history.

(56) References Cited

U.S. PATENT DOCUMENTS

| | | | | |
|---|---|---|---|---|
| 6,778,684 | B1 * | 8/2004 | Bollman | G06T 11/60 |
| | | | | 382/167 |
| 9,665,809 | B2 * | 5/2017 | Nakayama | G06K 15/4045 |
| 11,809,763 | B2 * | 11/2023 | Kawasaki | G06F 3/1229 |
| 2003/0112253 | A1 * | 6/2003 | Cazier | G09G 5/10 |
| | | | | 345/619 |
| 2008/0079750 | A1 * | 4/2008 | Setlur | G06F 3/14 |
| | | | | 345/593 |
| 2010/0077350 | A1 * | 3/2010 | Lim | G06Q 10/107 |
| | | | | 715/810 |
| 2014/0310620 | A1 * | 10/2014 | Banerjee | G06F 8/38 |
| | | | | 715/762 |

FOREIGN PATENT DOCUMENTS

JP    4630783 B2    2/2011

* cited by examiner

*Primary Examiner* — Alvin H Tan
(74) *Attorney, Agent, or Firm* — Venable LLP

(57) ABSTRACT

An apparatus comprises a receiver configured to receive, as a request for a remaining amount of a consumable item and a color for remaining amount display of the consumable item in the apparatus, information relating to a transmission source of the request, and a transmitter configured to transmit the remaining amount and the color to the transmission source in response to the request. The transmitter is configured to acquire a background color of the remaining amount display in response to the request, and when the background color acquired and a first display color set in advance as the color of the remaining amount display are determined to be close to each other according to a prescribed standard, transmit a second display color different from the first display color and the remaining amount to the transmission source.

9 Claims, 14 Drawing Sheets

PRIOR ART

FIG. 4

41 — marker-names:'PM','R','C','PGY','MBK','PBK','B','CO','GY','Y','M','PC'
42 — marker-colors:
'#E0A1E2','#D10716','#00CFFF','#E0E0E0','#000000','#000000','#0640C4','#C4C388','#808080','#FFDA00','#F200FF','#89D7E2'
43 — marker-levels : 80,60,60,80,70,90,40,50,100,70,100,10
. . . . .

FIG. 6

```
PM = #E0A1E2
R = #D10716
C = #00CFFF
PGY = #E0E0E0
MBK = #000000
PBK = #000000
B = #0640C4
CO = #C4C388
GY = #808080
Y = #FFDA00
M = #F200FF
PC = #89D7E2
```

FIG. 7

| OS TYPE | OS VERSION | THEME | BACKGROUND COLOR INFORMATION |
|---|---|---|---|
| desktop | 10 | light | #C8C8C8 |
| desktop | 11 | light | #E0E0E0 |
| desktop | 10 | dark | #404040 |
| mobile | 14 | light | #FFFFFF |

FIG. 9

91 — printer-uri :'ipp://xxxxxxx.local:631/ipp/print'
92 — requesting-user-name : 'Bob'
94 — requesting-host-type : 'desktop'
95 — requesting-host-version : '11'
96 — requesting-host-theme : 'light'
93 — requested-attributes : 'auth-info-required','marker-colors','marker-levels','marker-names'

FIG. 10

41 — marker-names:'PM','R','C','PGY','MBK','PBK','B','CO','GY','Y','M','PC'
1002 — marker-colors:
'#E0A1E2','#D10716','#00CFFF','#D0D0D0','#000000','#000000','#0640C4','#C4C388','#808080','#FFDA00','#F200FF','#89D7E2'
43 — marker-levels : 80,60,60,80,70,90,40,50,100,70,100,10
......

F I G. 13

```
91 ─── printer-uri : 'ipp://xxxxxxxx.local:631/ipp/print'
92 ─── requesting-user-name : 'Bob'
1304 ─── marker-menu-color : #E0E0E0'
93 ─── requested-attributes : 'auth-info-required','marker-colors','marker-levels','marker-names'
```

IMAGE FORMING APPARATUS AND CONTROL METHOD FOR DISPLAYING THE AMOUNT OF A CONSUMABLE ITEM

BACKGROUND OF THE INVENTION

Field of the Invention

The present invention relates to a remaining amount display of a consumable item in an image forming apparatus.

Description of the Related Art

Printer specific software (hereinafter, referred to as a specific printer driver) provided by a printer vendor is known as software for controlling a printer. A technique in which an operating system (hereinafter referred to as an OS) provides a standard printing function (hereinafter referred to as an OS standard printing function) without requiring a specific printer driver is similarly known.

In addition, a technique that can display a consumable item remaining amount of a printer (hereinafter, referred to as an OS consumable item remaining amount display function) provided by a printing system (hereinafter, referred to as an OS printing system) provided by an OS is known. In either the case of using the OS standard printing function or the case of using the specific printer driver, the OS consumable item remaining amount display function can be used.

In the OS consumable item remaining amount display function, by notifying the OS printing system of the display designation color and the remaining amount ratio for each consumable item, it is possible to display the consumable item with the notified display designation color/remaining amount ratio in a predetermined display region of the OS. At that time, how to acquire the information on the display designation color and the remaining amount ratio to be notified to the OS printing system differs depending on whether the OS standard printing function is used or the specific printer driver is used.

When the OS standard printing function is used, the OS printing system acquires the display color information and the remaining amount information for each consumable item from the printer by itself, and uses the information for the display of the OS consumable item remaining amount display function. On the other hand, when the specific printer driver is used, the remaining amount information for each consumable item acquired from the printer by the specific printer driver and the display color information for each consumable item included in the specific printer driver are notified together to the OS printing system, thereby realizing the OS consumable item remaining amount display function. Such a technique of a consumable item remaining amount display function that acquires consumable item information from a printer and displays the consumable item information on an application (Japanese Patent No. 4630783) is known.

Since the OS consumable item remaining amount display function is a function implemented in the display region of the OS, it may be affected by a change in a user interface (UI) design due to version upgrade of the OS. Due to this UI design change, the background color of the remaining amount display of the consumable item of the OS consumable item remaining amount display function may be changed. Thus, the background color of the remaining amount display of the consumable item and the display color of the consumable item may become very close to each other. As a result, depending on the OS, the consumable item may appear empty although there is a remaining amount of the consumable item. In particular, colors such as a gray ink color and a white ink color, which are often used in the UI of the OS, are often colors close to the background color of the consumable item remaining amount display of the OS consumable item remaining amount display function. Therefore, a problem arises such that the consumable item appears empty although there is a remaining amount of the consumable item.

SUMMARY OF THE INVENTION

The present invention provides a technique for allowing the remaining amount display of the consumable item to be easily seen even in an environment where the background color of the remaining amount display of the consumable item can be changed.

According to the first aspect of the present invention, there is provided an image forming apparatus comprising: a receiver configured to receive, as an acquisition request for a remaining amount of a consumable item and a color for remaining amount display of the consumable item in the image forming apparatus, information relating to a transmission source of the acquisition request; and a transmitter configured to transmit the remaining amount of the consumable item and the color of the remaining amount display to the transmission source in response to the acquisition request; wherein the transmitter is configured to acquire a background color of the remaining amount display in response to the acquisition request, and when the background color acquired and a first display color set in advance as the color of the remaining amount display are determined to be close to each other according to a prescribed standard, transmit a second display color different from the first display color and the remaining amount to the transmission source.

According to the second aspect of the present invention, there is provided a control method of an image forming apparatus, the method comprising: receiving, as an acquisition request for a remaining amount of a consumable item and a color for remaining amount display of the consumable item in the image forming apparatus, information relating to a transmission source of the acquisition request; and transmitting the remaining amount of the consumable item and the color of the remaining amount display to the transmission source in response to the acquisition request; wherein in the transmitting, a background color of the remaining amount display is acquired in response to the acquisition request, and when the background color acquired and a first display color set in advance as the color of the remaining amount display are determined to be close to each other according to a prescribed standard, a second display color different from the first display color and the remaining amount are transmitted to the transmission source.

Further features of the present invention will become apparent from the following description of exemplary embodiments with reference to the attached drawings.

BRIEF DESCRIPTION OF THE DRAWINGS

FIG. 4 is a diagram illustrating a configuration example of information (consumable item information) related to the consumable item.

FIG. 6 is a diagram illustrating a configuration example of information managed by a management unit 503.

FIG. 7 is a diagram illustrating a configuration example of information managed by a management unit 504.

FIG. 9 is a diagram illustrating a configuration example of an acquisition request generated in step S802.

FIG. 10 is a diagram illustrating a configuration example of information related to a consumable item (consumable item information).

FIG. 13 is a diagram illustrating a configuration example of an acquisition request generated in step S1202.

DESCRIPTION OF THE EMBODIMENTS

Figure 1:
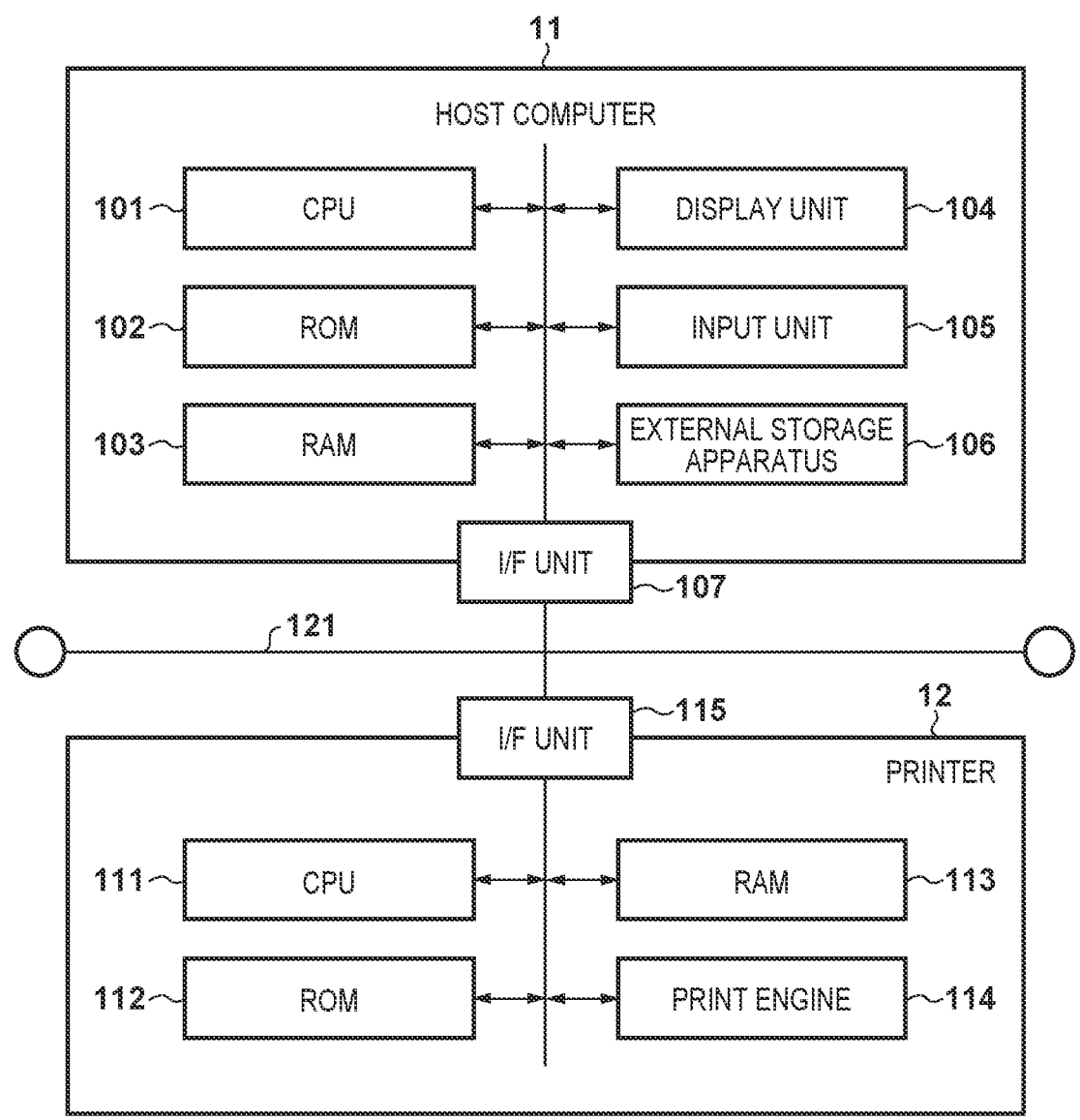
FIG. 1 is a block diagram illustrating a hardware configuration example of an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image forming apparatus according to the present embodiment will be described as an example of an image forming apparatus that performs the following processing. That is, as an acquisition request for a remaining amount of a consumable item and the color of the remaining amount display of the consumable item in the image forming apparatus, information relating to the transmission source of the acquisition request is received, and the remaining amount of the consumable item and the color of the remaining amount display are transmitted to the transmission source in response to the acquisition request. Here, in the transmitting, the background color of the remaining amount display is acquired in response to the acquisition request, and when the background color acquired and a first display color set in advance as the color of the remaining amount display are determined to be close to each other according to a prescribed standard, a second display color different from the first display color and the remaining amount are transmitted to the transmission source.

First, a hardware configuration example of an image forming system according to the present embodiment will be described with reference to a block diagram of FIG. 1. As illustrated in FIG. 1, the image forming system according to the present embodiment includes a host computer 11, which is an example of an information processing apparatus, and a printer 12, which is an example of an image forming apparatus. The host computer 11 and the printer 12 are configured to be able to perform data communication with each other via a communication bus 121 such as Ethernet (trade name) or USB. The network configuration between the host computer 11 and the printer 12 is not limited to a specific network configuration.

First, the host computer 11 will be described. A computer apparatus such as a desktop type or notebook type personal computer (PC), a smartphone, or a tablet terminal apparatus can be applied to the host computer 11.

A CPU 101 executes various types of processing by using a computer program and data stored in a ROM 102 or a RAM 103. Accordingly, the CPU 101 entirely controls the operation of the host computer 11, and executes or controls various types of processing described as being performed by the host computer 11.

The ROM 102 has stored therein setting data of the host computer 11, computer programs and data related to activation of the host computer 11, computer programs and data related to basic operations of the host computer 11, or the like.

The RAM 103 includes an area for storing computer programs and data loaded from the ROM 102 or an external storage apparatus 106, or an area for storing various pieces of data received from the printer 12 via an I/F unit 107. The RAM 103 further includes a work area used when the CPU 101 executes various types of processing. The RAM 103 may thus provide various areas as appropriate.

A display unit 104, including a liquid crystal screen or a touch panel screen, can display results of processing by the CPU 101 with images, characters, or the like. Here, the display unit 104 may be a projection apparatus, such as a projector that projects images or characters.

An input unit 105, which is a user interface, such as a keyboard, a mouse or a touch panel, is operated by a user to allow inputting various instructions to the CPU 101.

The external storage apparatus 106 is a large-capacity information storage apparatus such as a hard disk drive apparatus. The external storage apparatus 106 stores an OS, various types of application software, computer programs and data for causing the CPU 101 to execute or control various types of processing described as being performed by the host computer 11, and the like. The computer programs and data stored in the external storage apparatus 106 are loaded to the RAM 103 as appropriate according to the control by the CPU 101, which are then subjected to processing by the CPU 101.

The I/F unit 107 is a communication interface configured to perform data communication with the printer 12. The CPU 101, the ROM 102, the RAM 103, the display unit 104, the input unit 105, the external storage apparatus 106, and the I/F unit 107 are all connected to a system bus.

Next, the printer 12 will be described. In the present embodiment, the printer 12 is an ink jet printer, but is not limited thereto, and may be a printer of another printing type.

A CPU 111 executes various types of processing by using computer programs and data stored in a ROM 112 or a RAM 113. Accordingly, the CPU 111 entirely controls the operation of the printer 12, and executes or controls various types of processing described as being performed by the printer 12.

The ROM 112 stores setting data of the printer 12, computer programs and data related to activation of the printer 12, computer programs and data related to the basic operation of the printer 12, and the like. The computer programs and data relating to the basic operation of the printer 12 include computer programs and data for controlling a print engine 114.

The RAM 113 includes an area for storing data received from the host computer 11 via the I/F unit 115, or an area for storing computer programs and data loaded from the ROM 112. Furthermore, the RAM 113 includes a work area used when the CPU 111 or the print engine 114 executes various types of processing. The RAM 113 may thus provide various areas as appropriate.

The print engine 114 forms an image or a character on a print medium such as paper based on print data transmitted from the host computer 11, and outputs the print medium on which the image or the character is formed.

The I/F unit 115 is a communication interface configured to perform data communication with the host computer 11. The CPU 111, the ROM 112, the RAM 113, and the print engine 114 are all connected to a system bus.

In such a configuration, the printer 12 transmits status information indicating the current state of the printer 12 to the host computer 11 in response to a request from the host computer 11. The status information includes, for example, information indicating an operation state in the printer 12, such as "printing" and "standby state", and information for notifying a state of an error that has occurred in the printer 12, such as "out of paper", "cover open", and "no remaining amount of consumable item". In addition, the status information includes information such as the type of consumable item currently mounted on the printer 12, the display color for each consumable item, and the remaining amount for each consumable item. Here, the "consumable item" is assumed to be ink of each color used in the printer 12 in the present embodiment.

Figure 2:
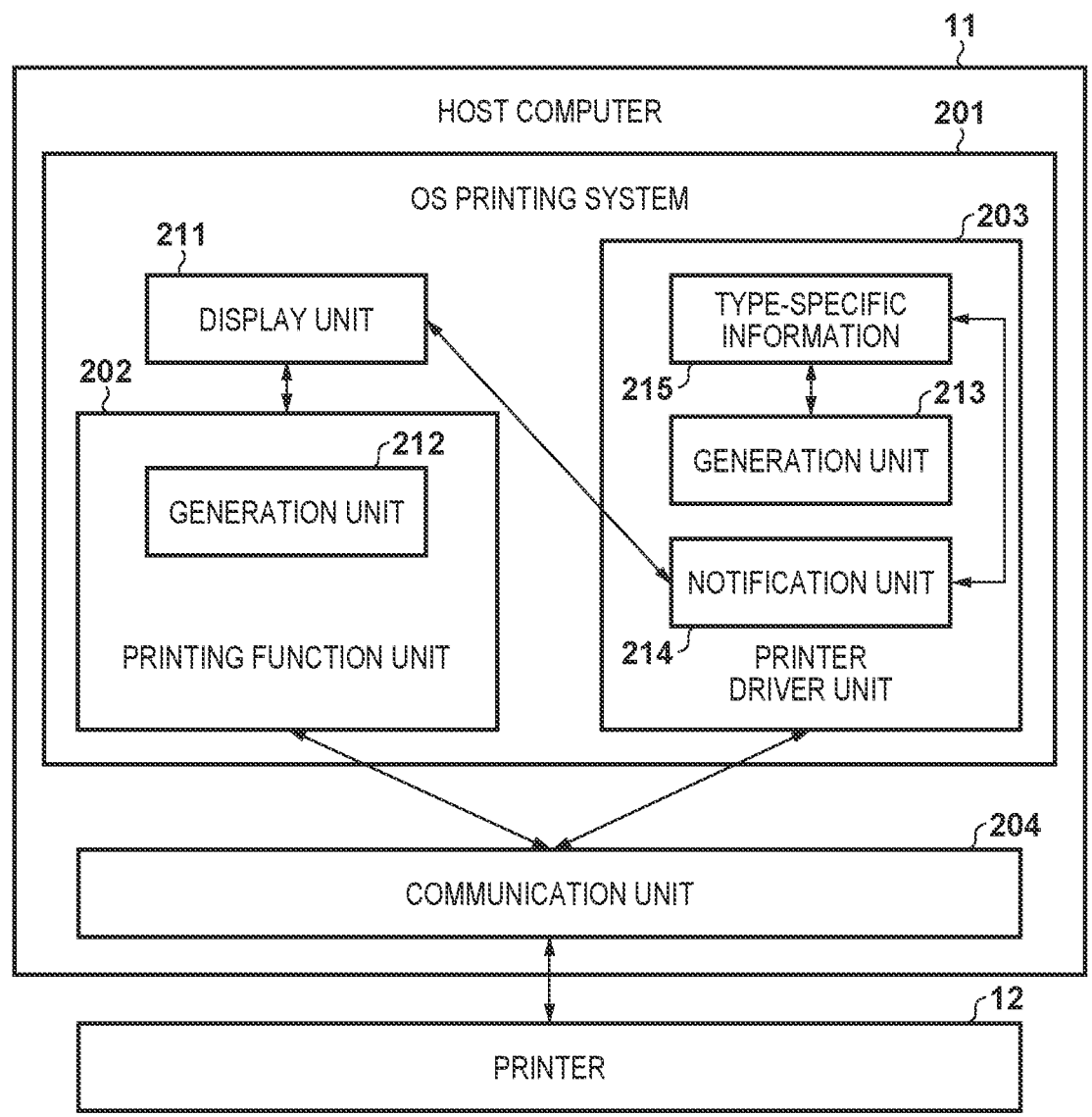
FIG. 2 is a block diagram illustrating a configuration example of software (computer program) stored in an external storage apparatus 106 of a host computer 11.

Next, a configuration example of software (computer program) stored in the external storage apparatus 106 of the host computer 11 will be described with reference to a block diagram of FIG. 2. Hereinafter, each functional unit illustrated in FIG. 2 will be described as a main unit of processing, but actually, the function of the functional unit is realized by the CPU 101 executing a computer program corresponding to the functional unit. The OS printing system 201 is a printing system provided by the OS, and includes a display unit 211, a printing function unit 202, and a printer driver unit 203.

First, the printing function unit 202 will be described. The printing function unit 202 is software included in the OS. The printing function unit 202 includes a generation unit 212, and the generation unit 212 generates the acquisition request for the remaining amount of the consumable item in the printer 12 and the display color of the remaining amount. More specifically, the generation unit 212 generates, as the acquisition request, a set of a version of an OS installed in the external storage apparatus 106, a type of the OS, and a theme such as dark mode/light mode. Then, the generation unit 212 transmits the generated acquisition request to the printer 12 via a communication unit 204. Since the printer 12 transmits a response including the remaining amount of the consumable item and the display color of the remaining amount in response to the acquisition request, the generation unit 212 receives the response transmitted from the printer 12 via the communication unit 204, and notifies the display unit 211 of display color information and remaining amount information for each consumable item based on the received response. The display unit 211 causes the display unit 104 to display the remaining amount corresponding to the notified remaining amount information of the consumable item in the display color indicated by the notified display color information of the consumable item (display control).

Next, the printer driver unit 203 will be described. The printer driver unit 203 is driver software corresponding to the printer 12, and includes a generation unit 213 and a notification unit 214.

The generation unit 213 generates type-specific information 215 when the printer driver unit 203 is installed in the external storage apparatus 106. Since the generation unit 213 and the type-specific information 215 are not essential in the present embodiment, description of the generation unit 212 and the type-specific information 215 is omitted in the present embodiment.

The notification unit 214 generates an acquisition request for the remaining amount of the consumable item in the printer 12. Then, the generation unit 214 transmits the generated acquisition request to the printer 12 via the print communication unit 204. Since the printer 12 transmits the response including the remaining amount of the consumable item in response to the acquisition request, the generation unit 214 receives the response transmitted from the printer 12 via the communication unit 204. Then, the generation unit 214 transfers the received response and the display color of the consumable item held by the host computer 11 to the display unit 211. The display unit 211 causes the display unit 104 to display the remaining amount of the consumable item included in the response in the display color of the consumable item.

In the present embodiment, a case in which both the printing function unit 202 and the printer driver unit 203 are installed in the host computer 11 will be described. However, there may be a case where only one of the printing function unit 202 and the printer driver unit 203 is installed.

Figure 3:
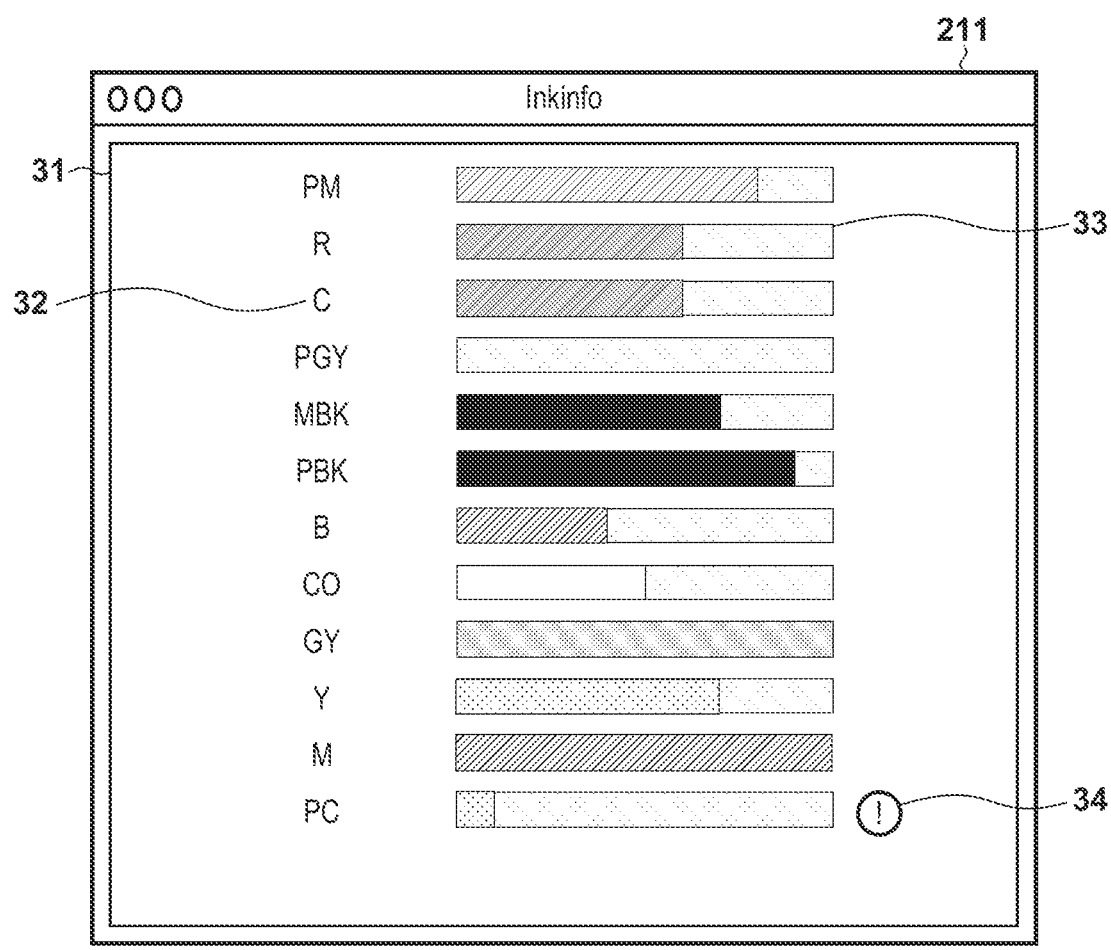
FIG. 3 is a diagram for describing a case where a remaining amount display of a consumable item by a display unit 211 is always displayed with a same display color regardless of a version or the like of an OS.

Here, a case where the remaining amount display of the consumable item by the display unit 211 is always displayed in the same display color regardless of the version or the like of the OS will be described using to FIG. 3 as an example. The window 31 illustrated in FIG. 3 is displayed on the display unit 104 by the display unit 211. In the window 31, a name 32 of the consumable item and a display 33 indicating a ratio of a current remaining amount with respect to a maximum remaining amount of the consumable item are displayed for each consumable item.

In the present embodiment, since the consumable item is an ink, the name 32 of the consumable item is the name (color name) of the ink. The display 33 is obtained by superimposing a bar representing the current remaining amount of the consumable item (the display color notified to the display unit 211 for the consumable item) on a bar representing the maximum remaining amount of the consumable item (the same display color (background color) for all the consumable items). For the consumable item whose remaining amount is less than or equal to a threshold value (in FIG. 3, ink of name 32 being "PC"), an attention icon 34 that warns a lack of remaining amount is displayed.

Here, in the display 33 of the consumable item (PGY ink) in which the current remaining amount is actually 80% with respect to the maximum remaining amount, the display color of the PGY ink has become the same color as the background color, and the remaining amount of the PGY ink cannot be known.

A configuration example of information related to the consumable item (consumable item information) included in a response received by the printing function unit 202 from the printer 12 via the communication unit 204 to display the window 31 of FIG. 3 will be described with reference to FIG. 4. In FIG. 4, the consumable item information is represented using Internet Printing Protocol (IPP) as one implementation example according to the OS standard protocol. This is information that can be acquired as IPP Response when Get-Printer-Attributes are requested as IPP Request. The consumable item information includes the name information 41 representing the name of the consumable item, the display color information 42 representing the display color of the consumable item, and the remaining amount information 43 representing the remaining amount of the consumable item.

In the present embodiment, the name information 41 indicates the name (color name) of the ink, and "PM", "R", "C", "PGY", "MBK", "PBK", "B", "CO", "GY", "Y", "M", and "PC" are registered.

The display color information 42 indicates the display color of a bar representing the remaining amount of each of the consumable items "PM", "R", "C", "PGY", "MBK", "PBK", "B" "CO", "GY", "Y" "M", and "PC" by a hexadecimal color code.

The remaining amount information 43 indicates a ratio (0 to 100 (%)) of the current remaining amount of the consumable item with respect to the maximum remaining amount for each of the consumable items "PM", "R", "C", "PGY", "MBK", "PBK", "B" "CO", "GY", "Y", "M", and "PC".

Here, it is assumed that the background color is "#E0E0E0". At this time, the display color information 42 of the ink having the name "PGY" (PGY ink) is "#E0E0E0", and the display color of the bar representing the remaining amount of the PGY ink and the background color are the same, and hence the remaining amount of the PGY ink is not known.

In the present embodiment, the display color of the remaining amount display of the consumable item is controlled not to be close to the background color determined according to the environment such as the version of the OS installed in the host computer 11, the type of the OS, and the theme such as the dark mode/light mode.

Figure 5:
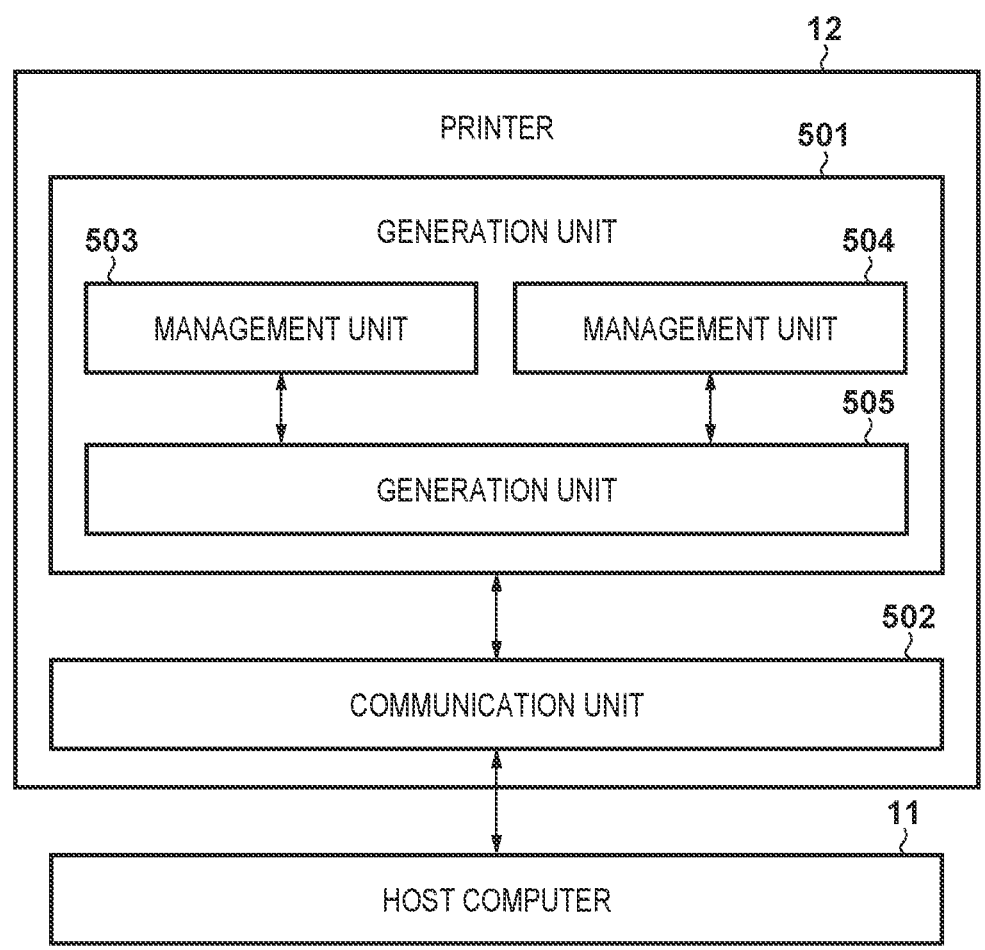
FIG. 5 is a block diagram illustrating a configuration example of software (computer program) stored in a ROM 112 of a printer 12.

Next, a configuration example of software (computer program) stored in the ROM 112 of the printer 12 will be described with reference to a block diagram of FIG. 5. Hereinafter, each functional unit illustrated in FIG. 5 will be described as a main unit of processing, but actually, the function of the functional unit is realized by the CPU 111 executing a computer program corresponding to the functional unit.

The generation unit 501 generates a response in response to the acquisition request received from the host computer 11 via the communication unit 502, and transmits the generated response to the host computer 11 via the communication unit 502. The generation unit 501 includes a management unit 503, a management unit 504, and a generation unit 505.

The management unit 503 manages, for each consumable item, display color information indicating a display color of the consumable item in the ROM 112. For example, as illustrated in FIG. 6, the management unit 503 manages display color information indicating display colors (hexadecimal color codes) of the bars representing the remaining amounts of each of the consumable items "PM" "R" "C", "PGY" "MBK", "PBK", "B", "CO", "GY", "Y", "M", and "PC" in the ROM112.

The management unit 504 manages, for each set of the version of the OS, the type of the OS, and the themes such as the dark mode/light mode, the background color information indicating the background color corresponding to the set in the ROM 112. For example, as illustrated in FIG. 7, the management unit 504 manages, for each set of the version of the OS, the type of the OS, and the themes such as the dark mode/light mode, the background color (hexadecimal color codes) corresponding to the set in the ROM 112.

When receiving "Set of the version of the OS, the type of the OS, and the theme such as dark mode/light mode" from the host computer 11 via the communication unit 502 as an acquisition request, the generation unit 505 specifies background color information corresponding to the set among the background color information managed by the management unit 504 as target background color information. Then, with respect to the display color information of each consumable item managed by the management unit 503, the generation unit 505 determines according to a prescribed standard whether or not the display color indicated by the display color information and the background color indicated by the target background color information are close to each other.

The prescribed standard is not limited to a specific standard. For example, when a difference between the display color indicated by the display color information and the background color indicated by the target background color information (an absolute value or a square value of a difference (color difference) between the display color indicated by the display color information and the background color indicated by the target background color information) is less than or equal to a threshold value, the generation unit 505 determines that the display color and the background color are close to each other.

Then, the generation unit 505 sets each of the consumable items "PM", "R", "C", "PGY", "MBK", "PBK", "B", "CO", "GY", "Y", "M", and "PC" as the consumable item of interest, and when not determining that the display color indicated by the display color information of the consumable item of interest and the background color indicated by the target background color information are close to each other according to the prescribed standard, registers the display color information managed by the management unit 503 for the consumable item of interest in the response as the display color information of the consumable item of interest. On the other hand, when determining that the display color indicated by the display color information of the consumable item of interest and the background color indicated by the target background color information are close to each other according to the prescribed standard, the generation unit 505 acquires display color information indicating a display color (another display color) different from the display color indicated by the display color information managed by the management unit 503 for the consumable item of interest, and registers the acquired display color information in the response as the display color information of the consumable item of interest. The another display color may be any color as long as it is visually recognized as a color different from the background color. Such another display color may be registered in advance, or the generation unit 505 may determine a color opposite to the background color as the another display color.

The generation unit 505 also registers, in the response, the name information indicating the name of each consumable item and the remaining amount information indicating the current remaining amount of each consumable item. The remaining amount information indicates, for example, a ratio of the current remaining amount with respect to the maximum remaining amount. Then, the generation unit 505 transmits the response generated in this manner to the host computer 11 via the communication unit 502.

Figure 8:
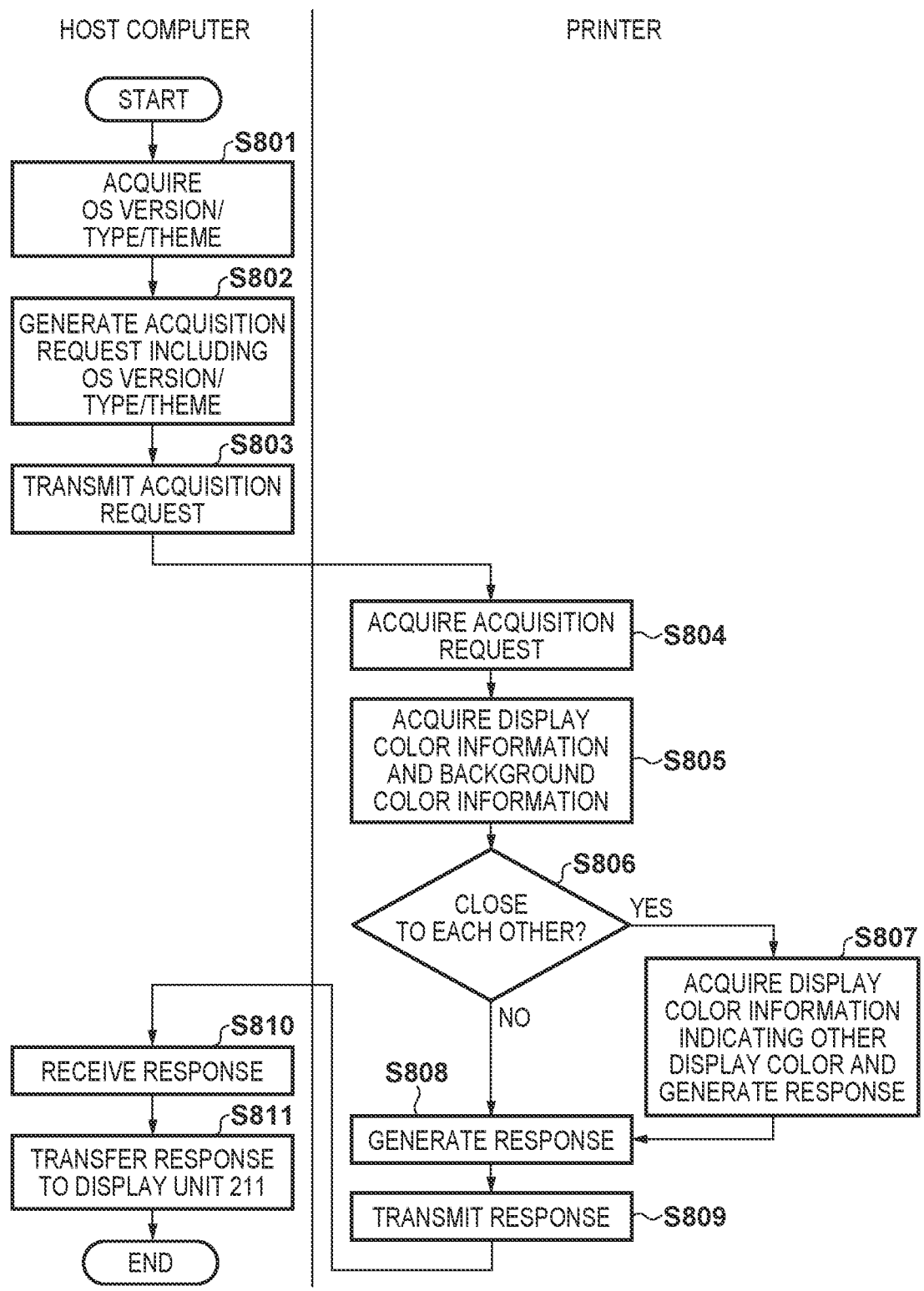
FIG. 8 is a flowchart of processing performed by each of the host computer 11 and the printer 12.

Next, processing performed by each of the host computer 11 and the printer 12 will be described with reference to the flowchart of FIG. 8. When the user operates the input unit 105 to input an instruction to activate a window for displaying the remaining amount of the consumable item as exemplified in FIG. 11, the processing according to the flowchart of FIG. 8 is started.

In step S801, the generation unit 212 acquires a set of the version of the OS installed in the external storage apparatus 106, the type of the OS, and the theme such as the dark mode/light mode.

In step S802, the generation unit 212 generates the set acquired in step S801 as an acquisition request. A configuration example of the acquisition request generated in step S802 will be described with reference to FIG. 9. In FIG. 9, the acquisition request is represented using IPP as one of implementation examples according to the OS standard protocol. This is an example when Get-Printer-Attributes is requested as the IPP Request.

The acquisition request includes a URL 91 which is a network address of the printer 12, a user name 92 of the host computer 11, an attribute 93 of the information to be requested for acquisition, a type of an OS 94, a version of an OS 95, and a theme 96 such as a dark mode/light mode. In the example of FIG. 9, "Bob" is designated as the user name 92 of the host computer 11, the name of the consumable item, the display color information of the consumable item, and the remaining amount information of the consumable item are designated as the attribute 93 of the information to be requested for acquisition, "desktop" is designated as the type of the OS 94, "11" is designated as the version of the OS 95, and "light" is designated as the theme 96 such as the dark mode/light mode.

In step S803, the generation unit 212 transmits the acquisition request generated in step S802 to the printer 12 via the communication unit 204. In step S804, the generation unit 505 receives the acquisition request transmitted from the host computer 11 via the communication unit 502.

In step S805, the generation unit 505 acquires "display color information for each consumable item" managed by the management unit 503. In the example of FIG. 6, the generation unit 505 acquires the display color information (hexadecimal color code information) of each of the inks of 12 colors such as the display color information "#E0A1E2" of the PM ink, the display color information "#D10716" of the R ink, the display color information "#00CCFF" of the C ink, and the display color information "#E0E0E0" of the PGY ink, and the like.

In addition, the generation unit 505 acquires various types of information including the version of the OS, the type of the OS, and the theme such as the dark mode/light mode from the acquisition request received in step S804. Then, the generation unit 505 acquires the background color information corresponding to the set acquired from the acquisition request as the target background color information from the "background color information for each set of the version of the OS, the type of the OS, and the theme such as dark mode/light mode" managed by the management unit 504.

For example, when the acquisition request having the configuration illustrated in FIG. 9 is received in step S804, the generation unit 505 acquires the URL 91, the user name 92, the attribute 93, the type of the OS 94, the version of the OS 95, and the theme 96 from the acquisition request. Here, the type of the OS 94 is "desktop", the version of the OS 95 is "11", and the theme 96 is "light". Then, the generation unit 505 acquires the background color information "#E0E0E0" corresponding to the type of the OS 94 "desktop", the version of the OS 95 "11", and the theme 96 "light" among the background color information managed by the management unit 504 in the ROM 112 as illustrated in FIG. 7.

In step S806, the generation unit 505 determines whether or not the display color indicated by the display color information and the background color indicated by the target background color information acquired in step S805 are close to each other according to a prescribed standard with respect to the display color information of each consumable item acquired in step S805. In the above example, whether or not each of the display color information "#E0A1E2" of the PM ink, the display color information "#D10716" of the R ink, the display color information "#00CCFF" of the C ink, the display color information "#E0E0E0" of the PGY ink and the like, and the background color information "#E0E0E0" are close to each other according to a prescribed standard is determined.

As a result of the determination, if there is display color information indicating the display color determined to be close to the background color indicated by the target background color information according to the prescribed standard among the display color information of each consumable item acquired in step S805, the process proceeds to step S807. On the other hand, if there is no display color information indicating the display color determined to be close to the background color indicated by the target background color information according to the prescribed standard among the display color information of each consumable item acquired in step S805, the process proceeds to step S808.

In the above example, the display color information "#E0E0E0" of the PGY ink and the background color #E0E0E0" are the same and are determined to be close to each other, and thus the process proceeds to step S807 in this case.

In step S807, the generation unit 505 acquires display color information indicating a display color (another display color) different from the display color indicated by the display color information managed by the management unit 503 for the consumable item determined to be close to the background color. Then, the generation unit 505 registers the acquired display color information (display color information indicating another display color) in the response as the display color information of the consumable item. The generation unit 505 also registers, in the response, the name information indicating the name of the consumable item determined to be close to the background color and the remaining amount information indicating the current remaining amount of the consumable item.

In the above example, the display color information "#E0E0E0" of the PGY ink and the background color "#E0E0E0" are the same and are determined to be close to each other, and thus the generation unit 505 acquires the display color information "#D0D0D0" different from the display color information "#E0E0E0" of the PGY ink. Then, the generation unit 505 registers the display color information "#D0D0D0" different from the display color information "#E0E0E0" of the PGY ink in the response as the display color information of the PGY ink.

In step S808, the generation unit 505 registers the display color information acquired in step S805 for the consumable item not determined to be close to the background color in the response as the display color information of the consumable item. The generation unit 505 also registers, in the response, the name information indicating the name of the consumable item not determined to be close to the background color and the remaining amount information indicating the current remaining amount of the consumable item.

In step S809, the generation unit 505 transmits the response generated in this manner to the host computer 11 via the communication unit 502. FIG. 10 illustrates a configuration example of information related to consumable item (consumable item information) included in the response. In FIG. 10, the consumable item information is represented using IPP as one implementation example according to the OS standard protocol. This is information that can be acquired as IPP Response when Get-Printer-Attributes are requested as IPP Request.

The consumable item information includes the name information 41 representing the name of the consumable item, the display color information 1002 representing the display color of the consumable item, and the remaining amount information 43 representing the remaining amount of the consumable item. As compared with the consumable item information of FIG. 4, in the display color information 1002, the display color information 42 of the PGY ink is not "#E0E0E0" but "#D0D0D0", and the display color of the bar indicating the remaining amount of the PGY ink and the background color are not the same.

In step S810, the generation unit 212 receives the response transmitted from the printer 12 via the communication unit 204. In step S811, the generation unit 212 transfers the response received from the printer 12 via the communication unit 204 in step S810 to the display unit 211.

The display unit 211 causes the display unit 104 to display a window (e.g., a window exemplified in FIG. 11) in which a bar having a length corresponding to the remaining amount indicated by the remaining amount information of the consumable item included in the response and having a display color indicated by the display color information of the consumable item is superimposed and displayed on a bar having a length corresponding to the maximum remaining amount and having a background color indicated by the background color information included in the response.

Figure 11:
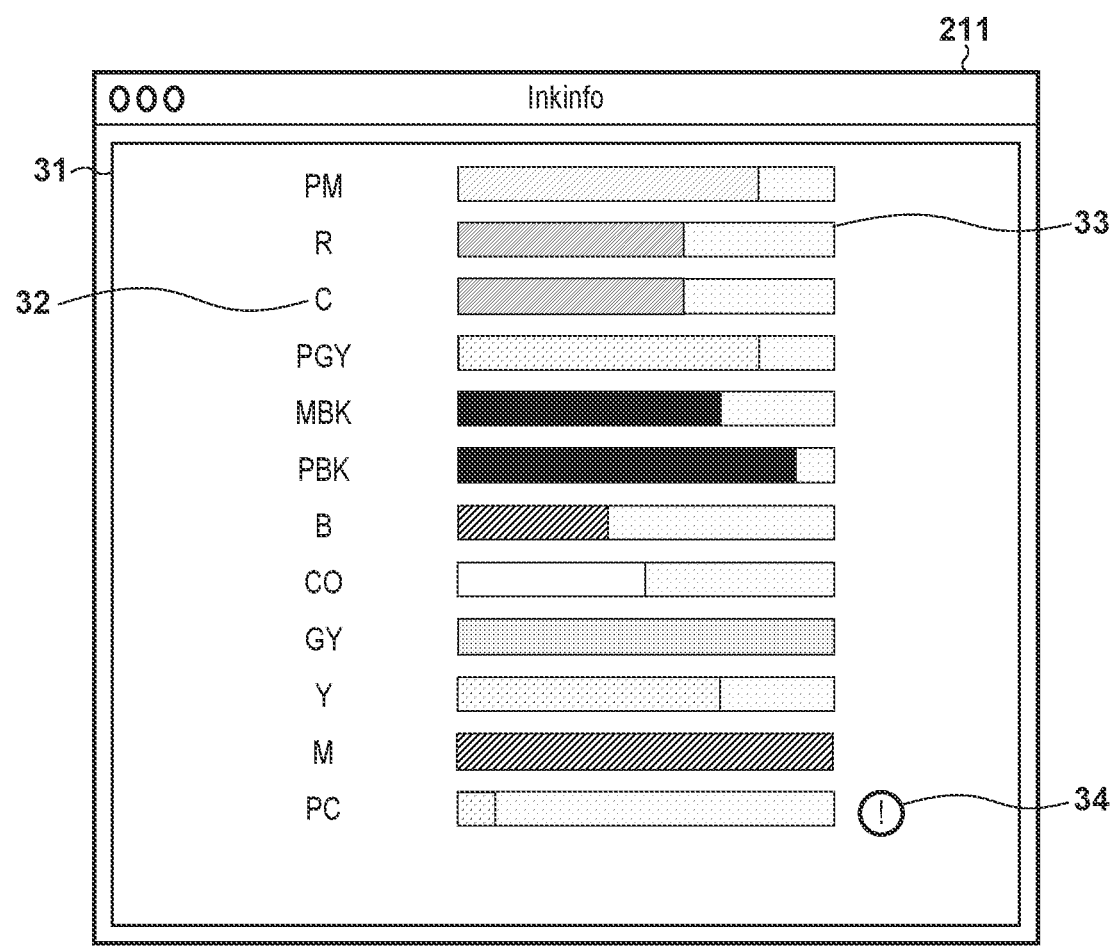
FIG. 11 is a diagram illustrating a display example of a window.

When the remaining amount of the PGY ink is displayed with the display color "#E0E0E0", a problem arises such that the remaining amount of the PGY ink is difficult to visually recognize since the display color is the same as the background color as illustrated in FIG. 3. However, when the response including the consumable item information of FIG. 10 is received, the display color of the remaining amount display of the PGY ink is "#D0D0D0", which is different from the background color, and thus such a problem is solved as illustrated in FIG. 11.

Note that the display method of the remaining amount display is not limited to a specific display method. For example, the bar representing the maximum remaining amount of the consumable item is not essential and may not be displayed. In this case, the background color is the color of the background on which the remaining amount display is superimposed. That is, the background color is not limited to the color of the bar, and may be any color as long as it is the color of the region serving as the background of the remaining amount display.

In addition, in a case where the display method can be designated, for example, by attaching a display frame or by displaying a pattern such as hatching or shading, the generation unit 212 may designate the display method in step S811 and notify the display unit 211 of the display method.

Furthermore, in the present embodiment, the generation unit 212 generates, as an acquisition request, a set of the version of the OS installed in the external storage apparatus 106, the type of the OS, and the theme such as dark mode/light mode. This is because the background color information corresponding to each set is held on the printer 12 side. In a case where one or more of the version of the OS, the type of the OS, and the theme, or other information related to the host computer 11 is used as an index on the printer 12 side, and the index and the corresponding background color information are managed by the printer 12 in association with each other, the generation unit 212 may generate the index as an acquisition request.

Second Embodiment

In each of the following embodiments including the present embodiment, only the difference from the first embodiment will be described, assuming that they are similar to the first embodiment unless otherwise stated. In the present embodiment, the printer 12 does not include the management unit 504, and thus, the printer 12 according to the present embodiment does not manage the "background color for each set of the version of the OS, the type of the OS, and the theme such as dark mode/light mode" in the ROM 112.

Figure 12:
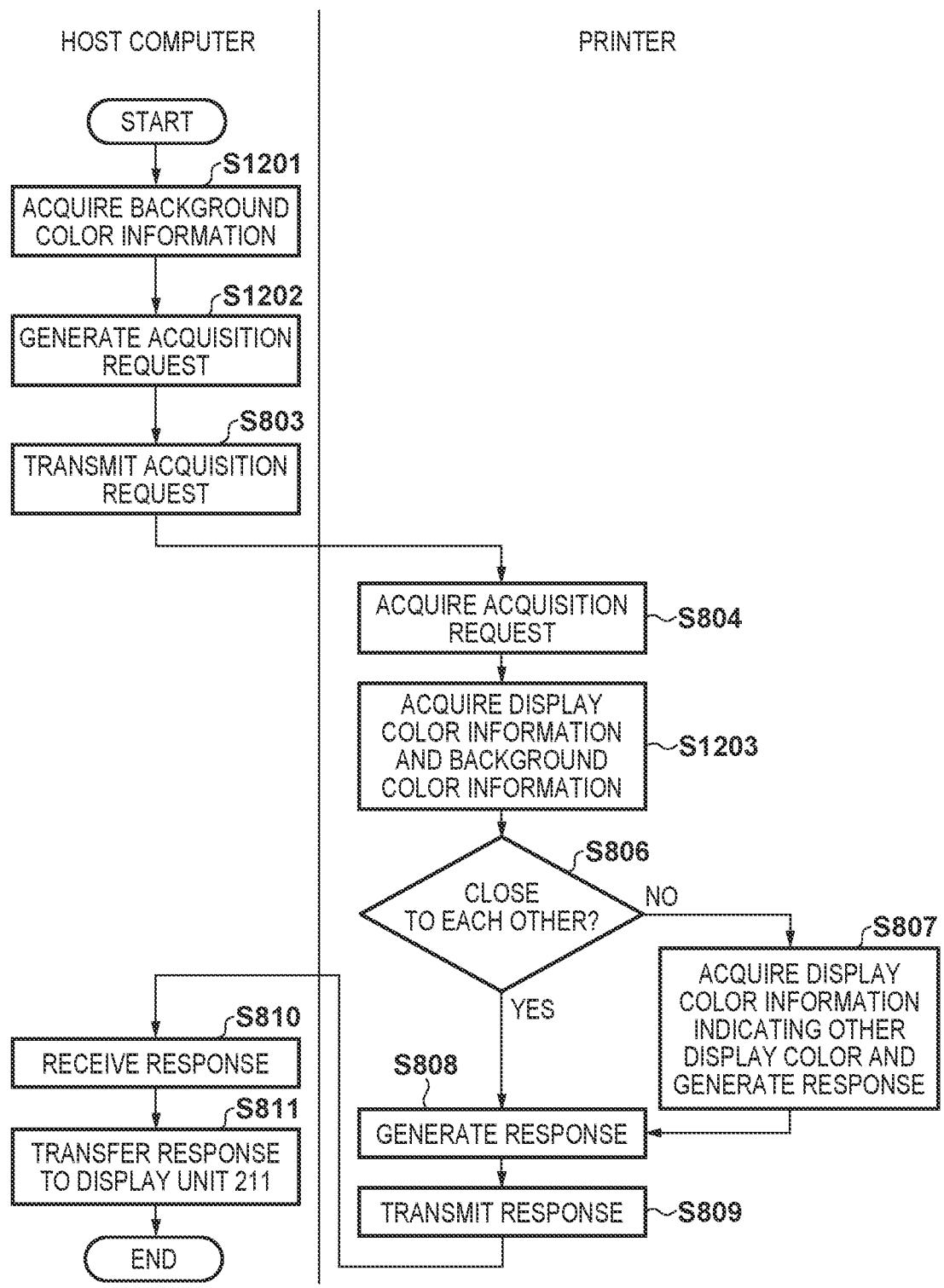
FIG. 12 is a flowchart of processing performed by each of the host computer 11 and the printer 12.

The processing performed by each of the host computer 11 and the printer 12 will be described with reference to the flowchart of FIG. 12. When the user operates the input unit 105 to input an instruction to activate a window for displaying the remaining amount of the consumable item as exemplified in FIG. 11, the processing according to the flowchart of FIG. 12 is started.

In step S1201, the generation unit 212 acquires the background color information indicating the background color of the remaining amount display of the consumable item. In step S1202, the generation unit 212 generates an acquisition request including the background color information acquired in step S1201. A configuration example of the acquisition request generated in step S1202 will be described with reference to FIG. 13. In FIG. 13, the acquisition request is represented using IPP as one of implementation examples according to the OS standard protocol. This is an example when Get-Printer-Attributes is requested as the IPP Request.

The acquisition request includes a URL 91 that is a network address of the printer 12, a user name 92 of the host computer 11, an attribute 93 of the information to be requested for acquisition, and background color information 1304 indicating a background color.

In step S803, the generation unit 212 transmits the acquisition request generated in step S1202 to the printer 12 via the communication unit 204. In step S804, the generation unit 505 receives the acquisition request transmitted from the host computer 11 via the communication unit 502.

In step S1203, the generation unit 505 acquires the "display color information for each consumable item" managed by the management unit 503, and also acquires the background color information from the acquisition request received in step S804.

In step S806, the generation unit 505 determines whether or not the display color indicated by the display color information and the background color indicated by the background color information acquired in step S1203 are close to each other according to a prescribed standard with respect to the display color information of each consumable item acquired in step S1203.

As a result of the determination, if there is display color information indicating the display color determined to be close to the background color indicated by the background color information acquired in step S1203 according to the prescribed standard among the display color information of each consumable item acquired in step S1203, the process proceeds to step S807. On the other hand, if there is no display color information indicating the display color determined to be close to the background color indicated by the background color information acquired in step S1203 according to the prescribed standard among the display color information of each consumable item acquired in step S1203, the process proceeds to step S808. In steps S807 to S811, processing similar to that of the first embodiment are performed.

Third Embodiment

Figure 14:
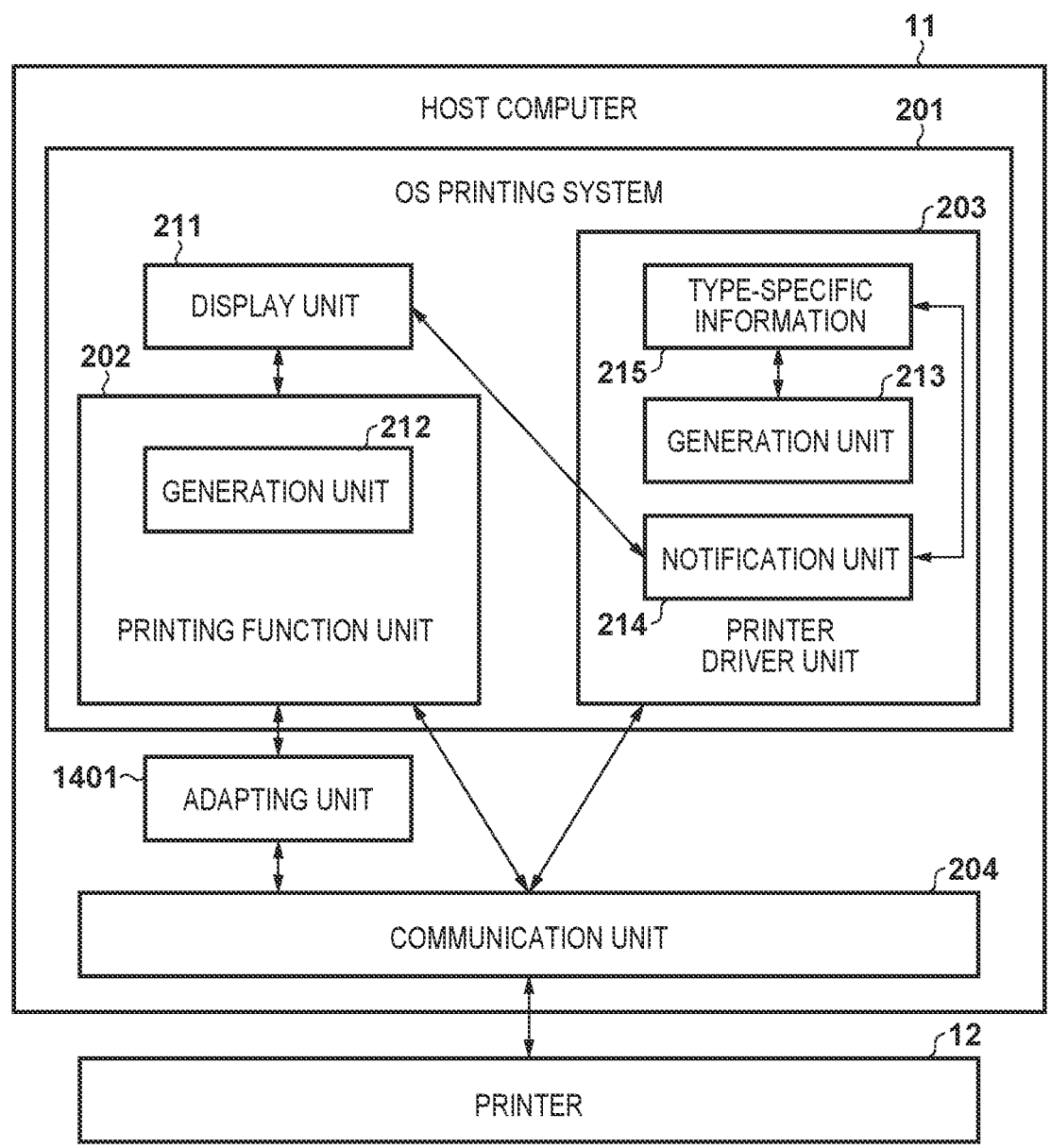
FIG. 14 is a block diagram illustrating a configuration example of software (computer program) stored in the external storage apparatus 106 of the host computer 11.

A configuration example of software (computer program) stored in the external storage apparatus 106 of the host computer 11 according to the present embodiment will be described with reference to a block diagram of FIG. 14. Hereinafter, each functional unit illustrated in FIG. 14 will be described as a main unit of processing, but actually, the function of the functional unit is realized by the CPU 101 executing a computer program corresponding to the functional unit. The configuration illustrated in FIG. 14 is a configuration in which an adapting unit 1401 is added to the configuration illustrated in FIG. 2.

Figure 15:
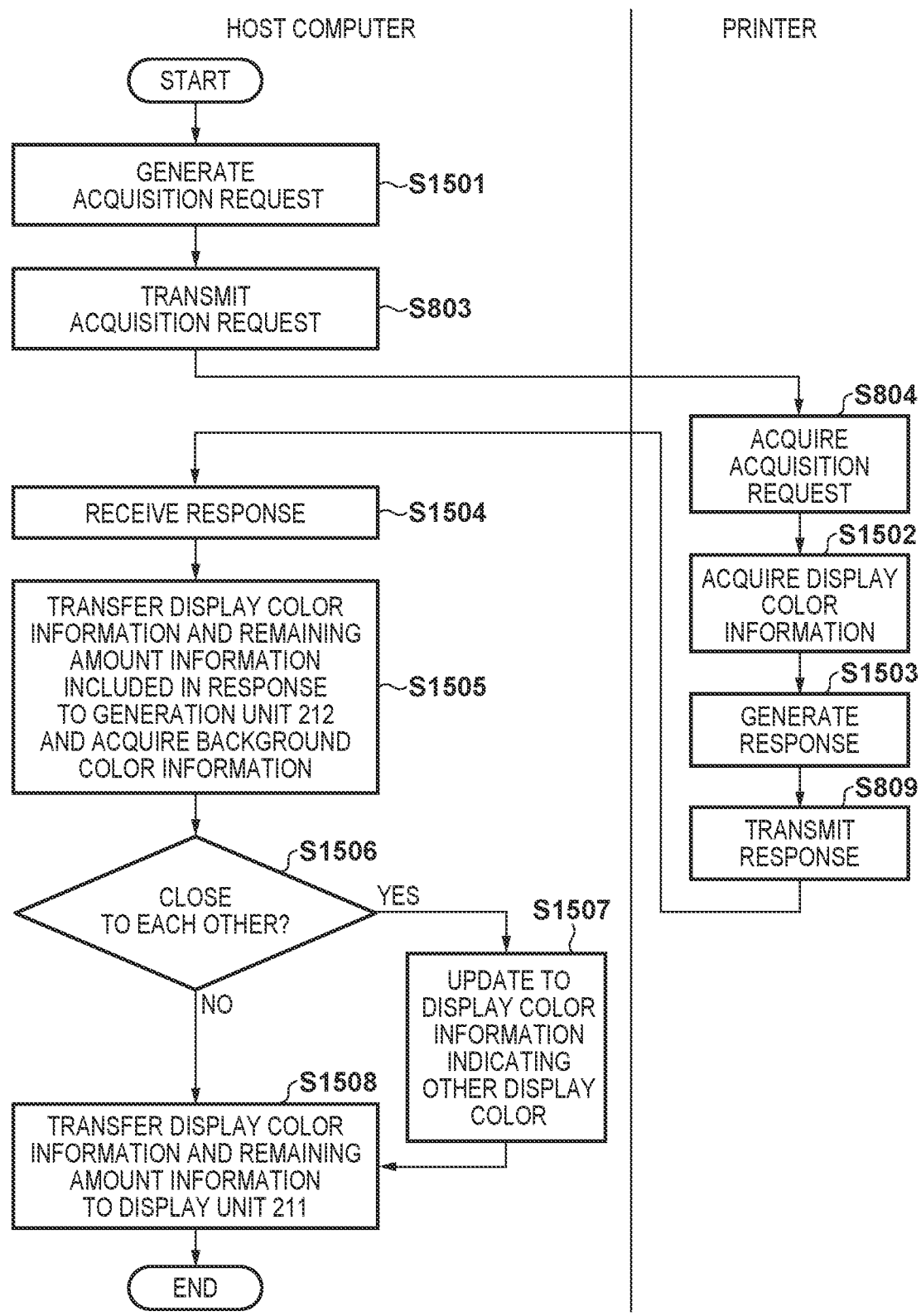
FIG. 15 is a flowchart of processing performed by each of the host computer 11 and the printer 12.

The processing performed by each of the host computer 11 and the printer 12 will be described with reference to the flowchart of FIG. 15. In FIG. 15, processing steps similar to the processing steps illustrated in FIG. 8 are denoted by the same reference numerals, and description of the processing steps will be omitted or briefly described. When the user operates the input unit 105 to input an instruction to activate a window for displaying the remaining amount of the consumable item as exemplified in FIG. 11, the processing according to the flowchart of FIG. 15 is started.

In step S1501, the generation unit 212 generates an acquisition request of a remaining amount of the consumable item in the printer 12 and a display color of the remaining amount. In step S803, the generation unit 212 transmits the acquisition request generated in step S1501 to the printer 12 via the communication unit 204.

In step S1502, the generation unit 505 acquires "display color information for each consumable item" managed by the management unit 503. In step S1503, the generation unit 505 registers the display color information acquired in step S1502 in the response as the display color information of the consumable item. The generation unit 505 also registers, in the response, the name information indicating the name of the consumable item corresponding to the display color information acquired in step S1502, and the remaining amount information indicating the current remaining amount of the consumable item. As described above, in the present embodiment, since the management unit 504 is not used in the printer 12, the printer 12 may not include the management unit 504 in the present embodiment.

In step S1504, the adapting unit 1401 receives the response transmitted from the printer 12 via the communication unit 204. In step S1505, the adapting unit 1401 transfers the display color information and the remaining amount information of the consumable item included in the response received from the printer 12 via the communication unit 204 in step S1504 to the generation unit 212.

Furthermore, the adapting unit 1401 acquires background color information. In a case where the current background color information can be directly acquired, the adapting unit 1401 acquires the current background color information by performing the background color information acquiring processing. The background color information acquiring processing is processing that can be performed only when the remaining amount information 33 is using a UI control being standard in the OS and the default display color, and "the default display color of the UI control" is acquired as the background color information. On the other hand, when the current background color information cannot be directly acquired, the adapting unit 1401 acquires the background color information corresponding to the current set of "the version of the OS, the type of the OS, and the theme" among the background color information held by the host computer 11 for each set of "the version of the OS, the type of the OS, and the theme". As described above, in the present embodiment as well, the method of acquiring the background color information is not limited to a specific acquiring method.

Next, in step S1506, the adapting unit 1401 determines whether or not the display color indicated by the display color information and the background color indicated by the background color information acquired in step S1505 are close to each other according to a prescribed standard with respect to the display color information of each consumable item acquired in step S1505, similarly to step S806 described above.

As a result of the determination, if there is display color information indicating the display color determined to be close to the background color indicated by the background color information according to the prescribed standard among the display color information of each consumable item acquired in step S1505, the process proceeds to step S1507. On the other hand, if there is no display color information indicating the display color determined to be close to the background color indicated by the background color information according to the prescribed standard among the display color information of each consumable item acquired in step S1505, the process proceeds to step S1508.

In step S1507, the adapting unit 1401 updates the display color information of the consumable item determined to be close to the background color to the display color information indicating a display color (another display color) different from the display color indicated by the display color information. Then, the adapting unit 1401 notifies the updated display color information to the generation unit 212.

In step S1508, the generation unit 212 transfers the display color information (the display color information transferred from the adapting unit 1401 in step S1507 for the display color information of the consumable item determined to be close to the background color) and the remaining amount information of the consumable item transferred from the adapting unit 1401 in step S1505 to the display unit 211.

Fourth Embodiment

Figure 16:
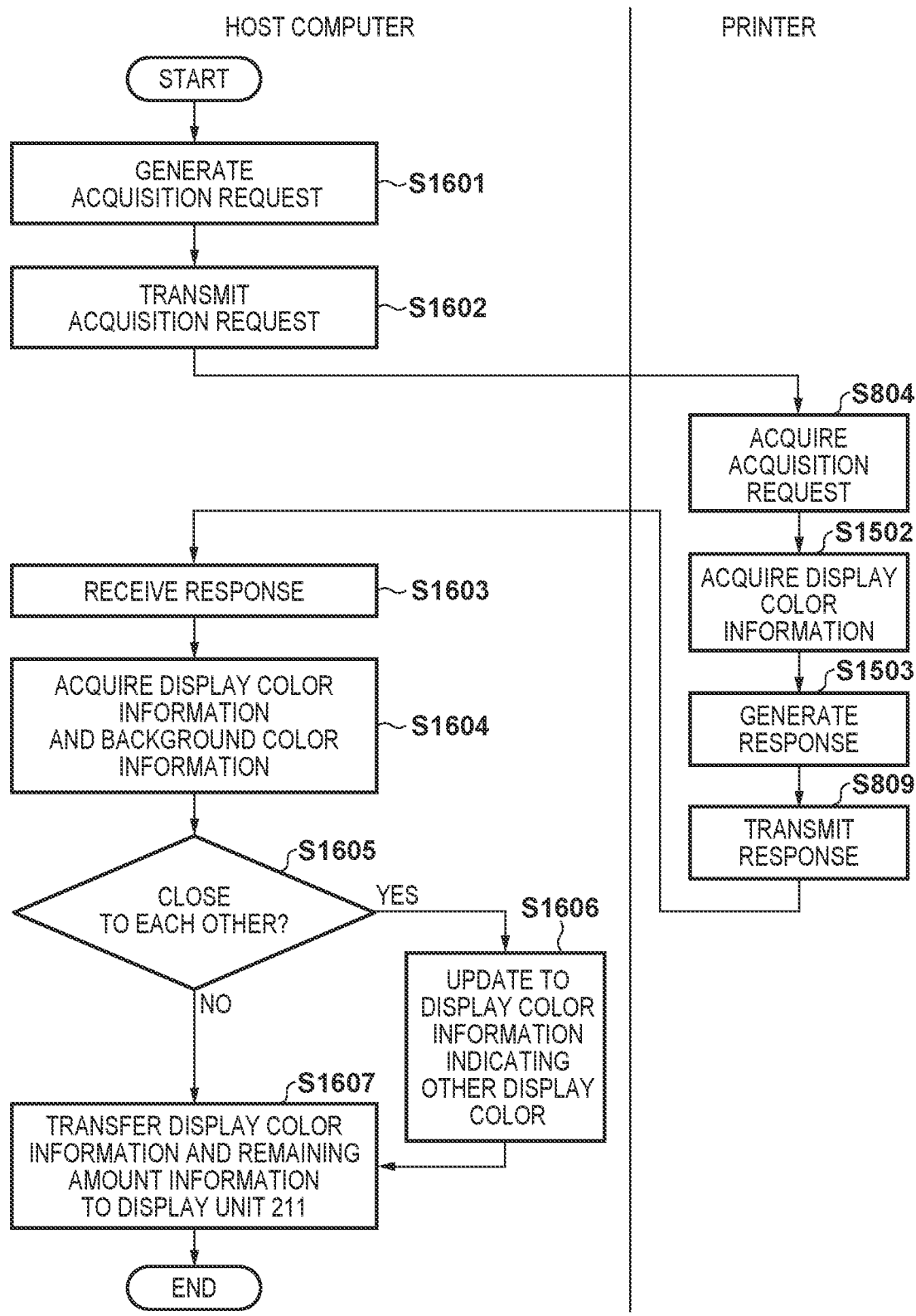
FIG. 16 is a flowchart of processing performed by each of the host computer 11 and the printer 12.

The processing performed by each of the host computer 11 and the printer 12 will be described with reference to the flowchart of FIG. 16. In FIG. 16, processing steps similar to the processing steps illustrated in FIG. 8 are denoted by the same reference numerals, and description of the processing steps will be omitted or briefly described.

When the user operates the input unit 105 to input an instruction to activate a window for displaying the remaining amount of the consumable item as exemplified in FIG. 11, the processing according to the flowchart of FIG. 16 is started.

In step S1601, the notification unit 214 generates an acquisition request for the remaining amount of the consumable item in the printer 12. In step S1602, the notification unit 214 transmits the acquisition request generated in step S1601 to the printer 12 via the communication unit 204.

In step S804, the generation unit 505 receives the acquisition request transmitted from the host computer 11 via the communication unit 502. In step S1603, the notification unit 214 receives the response transmitted from the printer 12 via the communication unit 204.

In step S1604, the notification unit 214 acquires the display color information corresponding to the name information included in the response received in step S1603 from the "display color information for each consumable item" held by the host computer 11. Furthermore, the notification unit 214 acquires the background color information similarly to the adapting unit 1401 according to the third embodiment. Note that, when the printer driver unit 203 is installed in the external storage apparatus 106, the generation unit 213 generates, as the type-specific information 215, information in which "set of the version of the OS, the type of the OS, and the theme such as dark mode/light mode" at that time point is associated with the background color information corresponding to the set. However, the notification unit 214 may acquire the background color information corresponding to the current set from the type-specific information 215.

In step S1605, the generation unit 505 determines whether or not the display color indicated by the display color information and the background color indicated by the background color information acquired in step S1604 are close to each other according to a prescribed standard with respect to the display color information of each consumable item acquired in step S1604.

As a result of the determination, if there is display color information indicating the display color determined to be close to the background color indicated by the background color information acquired in step S1604 according to the prescribed standard among the display color information of each consumable item acquired in step S1604, the process proceeds to step S1606. On the other hand, if there is no display color information indicating the display color determined to be close to the background color indicated by the background color information acquired in step S1604 according to the prescribed standard among the display color information of each consumable item acquired in step S1604, the process proceeds to step S1607.

In step S1606, the notification unit 214 updates the display color information of the consumable item determined to be close to the background color to the display color information indicating a display color (another display color) different from the display color indicated by the display color information.

In step S1607, the notification unit 214 transfers the display color information (the display color information updated in step S1606 for the display color information of the consumable item determined to be close to the background color) and the remaining amount information of each consumable item to the display unit 211.

In the present embodiment, the case has been described in which the host computer 11 transmits the acquisition request, to the printer 12, for the display color information of the consumable item, the name information indicating the name of the consumable item corresponding to the display color information, and the remaining amount information indicating the current remaining amount of the consumable item. However, in the present embodiment, the display color information transmitted from the printer 12 is not used. Therefore, the acquisition request may not include the acquisition request of the display color, in which case, the printer 12 may not perform various processing for including the display color information in the response.

Alternatively, the numerical values, processing timings, processing orders, processing entities, and data (information) transmission destinations/transmission sources/storage locations, and the like used in the embodiments described above are referred to for specific description as an example, and are not intended for limitation to these examples.

Alternatively, some or all of the embodiments described above may be used in combination as appropriate. Alternatively, some or all of the embodiments described above may be selectively used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-065856, filed Apr. 12, 2022, which is hereby incorporated by reference herein in its entirety.

What is claimed is:
1. An image forming apparatus comprising:
a receiver configured to receive, as an acquisition request for a remaining amount of a consumable item and a color for remaining amount display of the consumable item in the image forming apparatus, information relating to a transmission source of the acquisition request; and a transmitter configured to transmit the remaining amount of the consumable item and the color of the remaining amount display to the transmission source in response to the acquisition request, wherein the transmitter is configured to acquire a background color of the remaining amount display in response to the acquisition request, and when the background color acquired and a first display color set in advance as the color of the remaining amount display are determined to be close to each other according to a prescribed standard, transmit a second display color different from the first display color and the remaining amount to the transmission source, the receiver receives the acquisition request transmitted from the transmission source, the acquisition request including a version of an OS, a type of the OS, and a theme at the transmission source, and the transmitter acquires the background color corresponding to the acquisition request, and when the background color acquired and the first display color are determined to be close to each other according to the prescribed standard, transmits the second display color different from the first display color and the remaining amount to the transmission source; and wherein the image forming apparatus further comprises a non-transitory computer-readable storage medium configured to store information associating the version of the OS, the type of the OS, and the theme at the transmission source with the second display color, wherein the second display color is determined to be transmitted based on the acquisition request and the information stored in the storage.

2. The image forming apparatus according to claim 1, wherein when the background color acquired and the first display color are not determined to be close to each other according to the prescribed standard, the transmitter transmits the first display color and the remaining amount to the transmission source.

3. The image forming apparatus according to claim 1, wherein the consumable item is each ink used in the image forming apparatus.

4. The image forming apparatus according to claim 1, wherein whether or not the background color and the first display color are close to each other is determined based on a color difference between the background color acquired and the first display color.

5. The image forming apparatus according to claim 1, wherein the prescribed standard is an absolute value or a square value of a color difference between the background color acquired and the first display color.

6. A control method of an image forming apparatus, the method comprising:

receiving, as an acquisition request for a remaining amount of a consumable item and a color for remaining amount display of the consumable item in the image forming apparatus, information relating to a transmission source of the acquisition request; and transmitting the remaining amount of the consumable item and the color of the remaining amount display to the transmission source in response to the acquisition request, wherein in the transmitting, a background color of the remaining amount display is acquired in response to the acquisition request, and when the background color acquired and a first display color set in advance as the color of the remaining amount display are determined to be close to each other according to a prescribed standard, a second display color different from the first display color and the remaining amount are transmitted to the transmission source, in the receiving, the acquisition request transmitted from the transmission source is received, the acquisition request including a version of an OS, a type of the OS, and a theme at the transmission source, and in the transmitting, a background color corresponding to the acquisition request is acquired, and when the background color acquired and the first display color are determined to be close to each other according to the prescribed standard, the second display color different from the first display color and the remaining amount are transmitted to the transmission source; and further comprising storing in a storage information associating the version of the OS, the type of the OS, and the theme at the transmission source with the second display color, wherein the second display color is determined to be transmitted based on the acquisition request and the information stored in the storage.

7. The control method according to claim 6, wherein in the transmitting, when the background color acquired and the first display color are not determined to be close to each other according to the prescribed standard, the first display color and the remaining amount are transmitted to the transmission source.

8. The control method according to claim 6, wherein the consumable item is each ink used in the image forming apparatus.

9. The control method according to claim 6, wherein whether or not the background color and the first display color are close to each other is determined based on a color difference between the background color acquired and the first display color.

* * * * *